US006676262B1

United States Patent
Vernois

(10) Patent No.: US 6,676,262 B1
(45) Date of Patent: Jan. 13, 2004

(54) TELESCOPE

(76) Inventor: Goulven J Vernois, 1 Rue des Chalets, 78140 Velizy (FR)

(*) Notice: Subject to any disclaimer, the term of this patent is extended or adjusted under 35 U.S.C. 154(b) by 0 days.

(21) Appl. No.: 09/117,194

(22) PCT Filed: Jan. 31, 1997

(86) PCT No.: PCT/FR97/00189
§ 371 (c)(1),
(2), (4) Date: Jan. 22, 1999

(87) PCT Pub. No.: WO97/28469
PCT Pub. Date: Aug. 7, 1997

(30) Foreign Application Priority Data

Jan. 31, 1996 (FR) .............................................. 96 01132
Mar. 11, 1996 (FR) .............................................. 96 03027

(51) Int. Cl.⁷ ............................ G02B 5/08; G02B 7/182
(52) U.S. Cl. ..................... 359/846; 359/399; 359/878; 359/883
(58) Field of Search ................................ 359/399, 846, 359/847, 871, 878, 883, 868, 869

(56) References Cited

U.S. PATENT DOCUMENTS 3,151,206 A * 9/1964 Daymon ...................... 359/869
4,927,252 A * 5/1990 Burr ............................. 359/430
4,991,948 A * 2/1991 Hugenell ..................... 359/430
5,880,896 A * 3/1999 Ishii et al. ................... 359/846

FOREIGN PATENT DOCUMENTS

| GB | 2 247 323 | * | 2/1992 | ................. 359/846 |
| JP | 2-15227 | * | 1/1990 | ................. 359/399 |
| RU | 983 625 | * | 12/1982 | ................. 359/399 |
| RU | 1615655 | * | 12/1990 | ................. 359/846 |

OTHER PUBLICATIONS

Marker, D.K. Surface precision of optical membranes with curvature. Optics Express. vol. 1, No. 11. (1997).*

* cited by examiner

Primary Examiner—Mark A. Robinson

(57) ABSTRACT

Space telescope including at least a membranous mirror and a device to fold said mirror, this device allowing transport and orbiting, without residual deformation, of the said mirror, and being constituted by a circular thin disc comprising concentric circular undulations, and able to be rolled up.

18 Claims, 3 Drawing Sheets

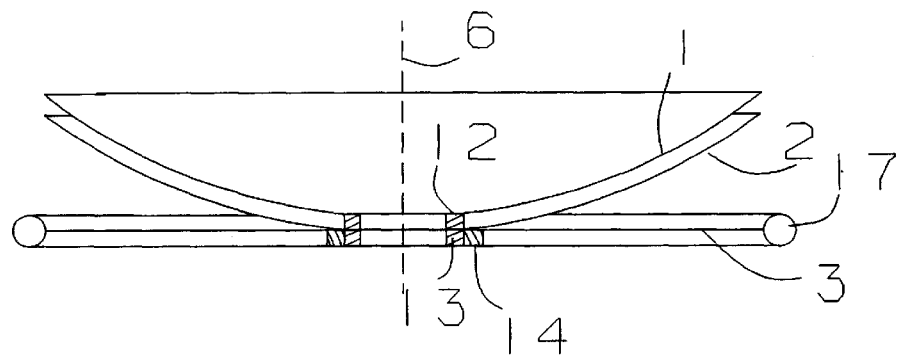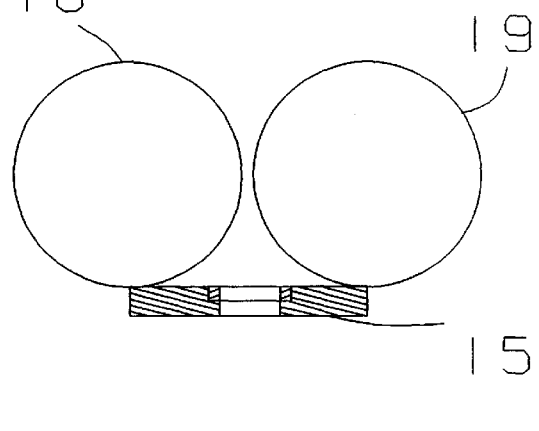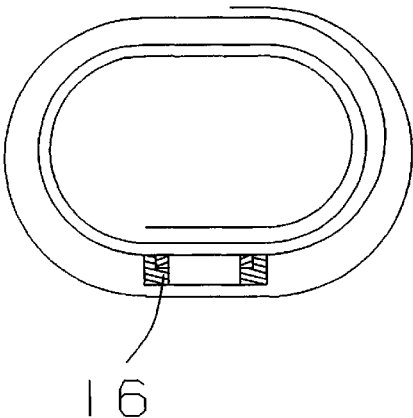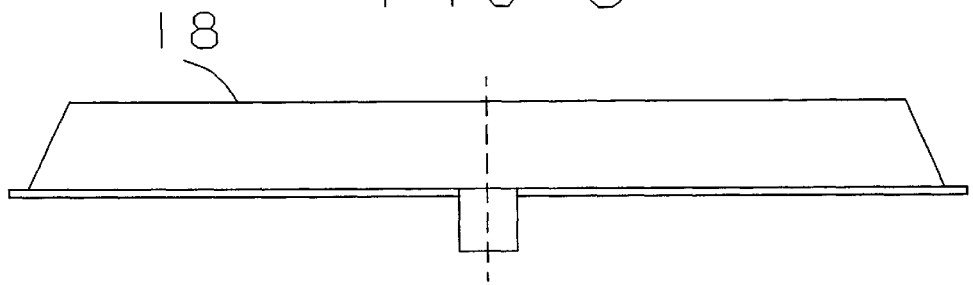

TELESCOPE

FIELD OF THE INVENTION

The invention concerns the membranous mirror telescopes.

FORMER ART

The U.S. application Ser. No. 08/809,620, describe a telescope made up of a mirror storey, a focal storey and a storey of control of the mirror.

The mirror storey comprises a membranous mirror and an actuating membrane, Jointed by a spacer.

For their folding, the parabolic mirror (or of another shape) and the associated actuating membrane are put in contact and are made quasi plane by a succession of alternated concentric deformations, and the quasi plane so obtained is rolled up on itself one or more time to form a cylinder.

A radio telescope called Inflatable Space Rigidizing Structure (ISRS) was put into orbit in 1996.

It is made up of a reflective membrane and of a passive membrane, the two membranes being jointed by their peripheries.

For its orbiting the ISRS was folded in a disordered way.

D. Daymon, U.S. Pat. No. 3,151,206, and D. K. Marker. OPTICS EXPRESS. 1 n 11 (1997), disclose various arrangements for mirror devices.

SUMMARY OF THE INVENTION

Disadvantages of the Former Art.

The disadvantage of the folding of the mirror and the actuating membrane as described in the U.S. request Ser. No. 08/809,620 is the difficulty in keeping without artifice its quasi flatness of folding and its rolling up on itself during orbiting.

The disadvantage of the mode of disordered folding of the ISRS is that this type of folding generated permanent deformations strongly decreasing the effectiveness of the said ISRS.

Auxiliary Membrane of Folding.

To facilitate the folding of mirror 1 and its actuating membrane 2, there exists, according to the invention, a preformed auxiliary membrane 3 comprising concentric undulations onto which the actuating membrane and the mirror will apply, and that <we> we will call auxiliary of folding; we will call optical unit the unit consisted the mirror, the actuating membrane and the auxiliary of folding.

These undulations consist of a concentric succession of circular elements of which the developed length of the generant is equal to the developed length of the generant 4 of mirror 1, and the peripheral diameter equal to the diameter of the mirror.

In a preferred realization, each undulation of the generant is with a minimal curvature.

This preformed auxiliary of folding, after unfolding, could be fastened by its periphery, with elastic damped means, to the top of the low part of the telescope.

This fixing will ensure the plane shape of the auxiliary of folding and the circularity of the top of this low element of the telescope.

Electric circuits integrated into this auxiliary of folding take part in the positioning of the actuating membrane

BRIEF DESCRIPTION OF THE FIGURES

FIG. 1: overall section of the optical unit.

FIG. 6: bicylindrical rolling up.

FIG. 7: Single-cylinder rolling up.

FIG. 8: Joinning of the folded optical unit and of the storey mirror.

DETAILED DESCRIPTION

Theoretical Form of the Generant of the Auxiliary of Folding.

Figure 2:
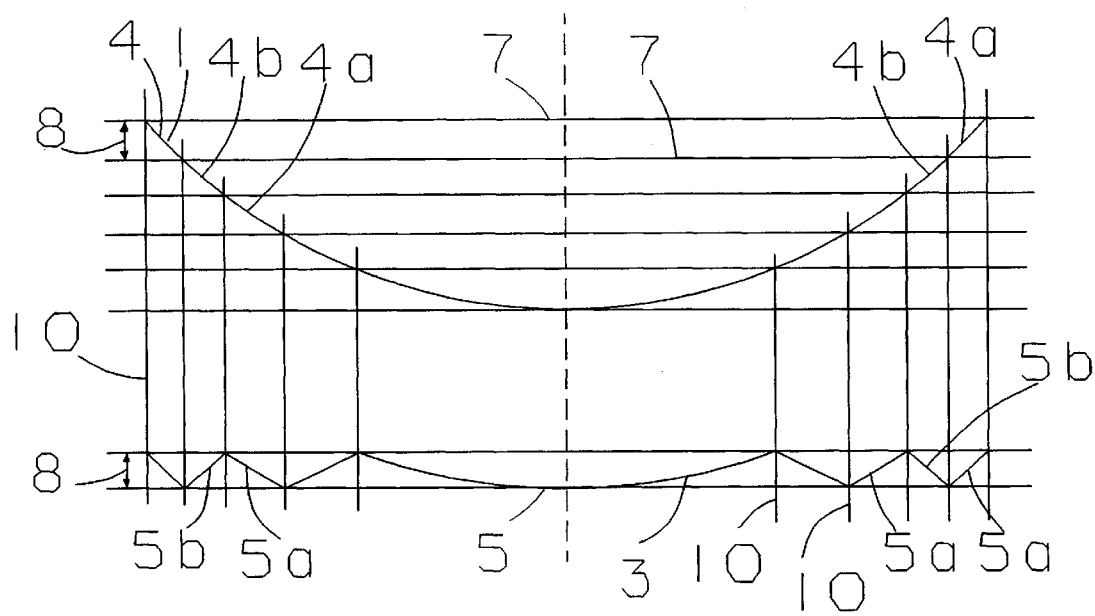
FIG. 2: sections of the mirror 1 and of the auxiliary of folding 3.

FIG. 2 shows generant 4 of a mirror 1 and generant 5 of auxiliary of folding 3.

Generant 5 of the auxiliary of folding 3 is constituted of the succession of the translations parallel with the optical axis 6 of mirror 1 of direct element 4a and turned over element 4b of the generant 4 of mirror 1 sectioned by plans 7, and parallel between them, perpendicular to the axis optical 6 of the mirror, and separated by a distance 8.

In practice, angular connection infers unacceptable deformations of the mirror or actuating membrane on the level of this angular connection, but it makes it possible to better understand the principle of the folding of the membrane.

Figure 4:
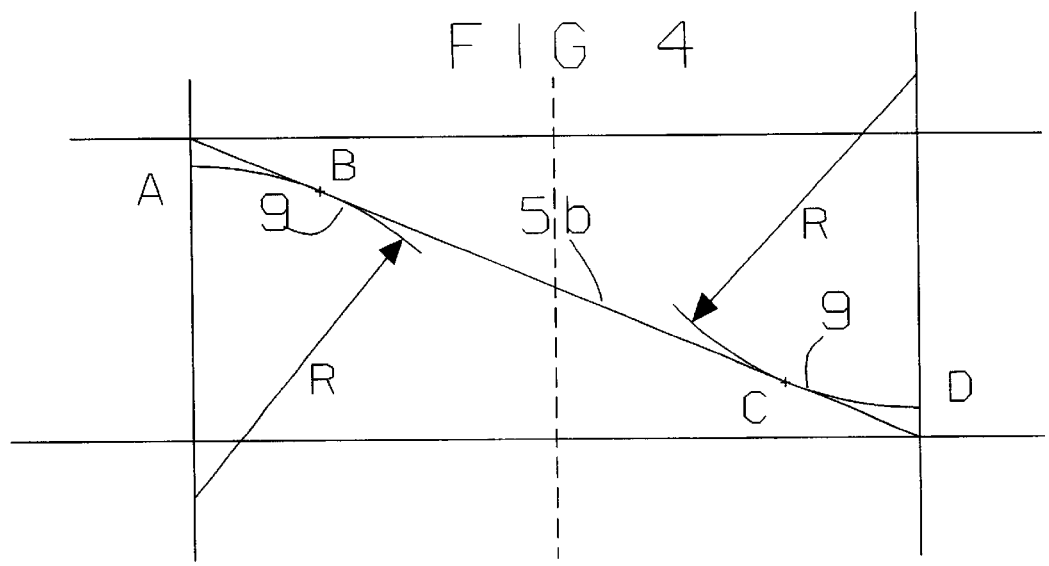
FIG. 4: element of generant of the auxiliary of folding 3.

According to the invention, FIG. 4, the elements of connection 9 are arcs of circles of radius R, centered on lines 10 translating the elements of generant 4a and 4b.

The radius of curvature R and the position of the centers of curvature of the arcs of circle constituting the elements of connection 9 must be such as the sum of the lengths of the various elements of the elementary generant consisted of the arc of circle high AB, the arc of circle low CD, and element quasi parabolic BC with tangential connection with the two arcs of circle, is equal or slightly greater than the length of the element 4a or 4b correspondent of generant 4 of the mirror.

On an element 5a or 5b of generant of the auxiliary of folding 3 slightly longer than the element of generant 4a or 4b correspondent of the mirror, the mirror could be applied with a light tension favorable to a correct positioning, without that generating a radial deformation on a great scale.

Undulations with Constant Step.

In another realization of the invention, generant 4 is sectioned by equidistant lines parallel with the optical axis 6, generating elements of generant 4a and 4b from decreasing height of the periphery towards the center.

Simultaneous or Successive Foldings of the Mirror and the Actuating Membrane.

The folding of the actuating membrane is necessarily done before the folding of the membrane mirror, or simultaneously.

Generant 4 of FIG. 2 can account for the actuating membrane, the membrane mirror, or both simultaneously.

Figure 3:
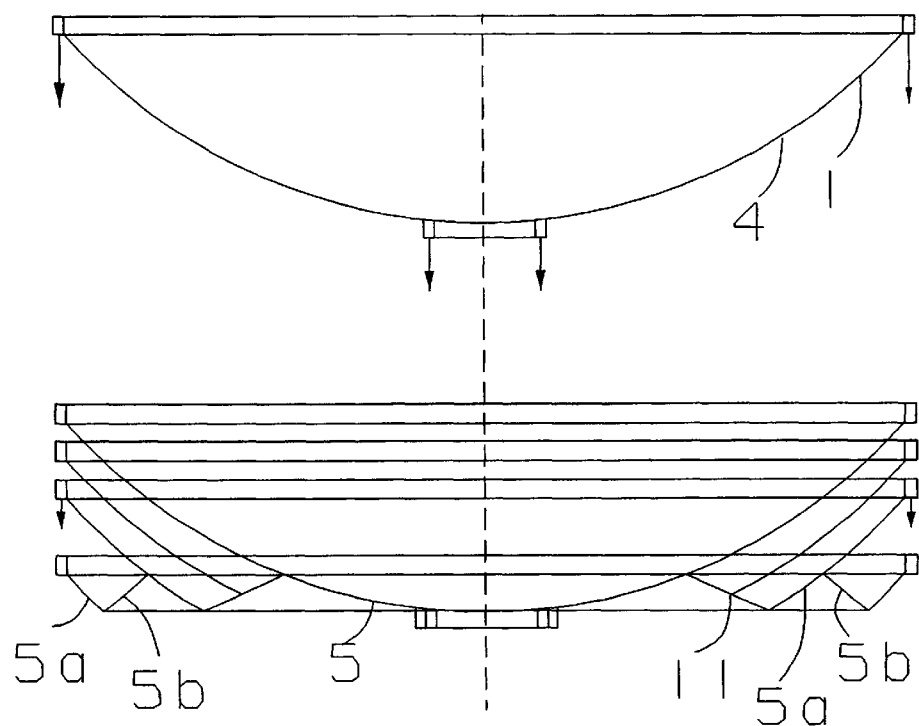
FIG. 3: principle of folding.

Principle of the Folding of a Membrane. (FIG. 3)

The membrane to be folded is posed on the auxiliary of folding 8 by a vertical displacement parallel with the optical axis 6.

According to the invention, the pressure above the membrane to be folded is higher than existing below part, so as to cause a tension of the membrane to be folded in the direction of its concavity.

This is obtained, in a first realization according to the invention, while closing by a tight lid the volume constituted by the concavity of the membrane to fold, and by creating an overpressure inside this enclosure, the periphery of the membrane to be folded and the lid being maintained by a rigid ring being able to move vertically.

In a second realization according to the invention, the volume of the concavity of the mirror is filled with a liquid which ensures overpressure.

Initially, the first element of generant 4*a* is put in contact with the element of the generant 5*a* correspondent of the auxiliary of folding 3 of which it has the shape. This is made without deformation of the membrane fold.

The movement of bringing together continuing, the membrane slightly tended by overpressure applies to the auxiliary of folding according to the curve of the first element of connection 9.

Then, the membrane to fold is deformed gradually and is applied on the turned over element of generant 5 until it reaches the second element of connection 9.

During the descent of the membrane to be folded, apart a circular zone of folding 11 which proceeds on the element of generant turned over 5, the free remainder of the membrane to fold preserve practically its original generant and the element of generant 4*a* according to is practically parallel to the element corresponding 5*a* of the auxiliary of folding 3 to which it comes to apply.

The cycle of folding reproduces then until the whole membrane to be folded is applied to the auxiliary of folding 3.

Auxiliary of Folding with Minimal Curvature.

To minimize the constraints of folding, each elementary generant of the auxiliary of folding consists of two arcs of circle of the same radius R, connected by a point of inflection BC.

These arcs of circles are the extensions of the elements of connection 9 of FIG. 4, which are connected one to the other by eliminating the quasi linear part.

Figure 5:
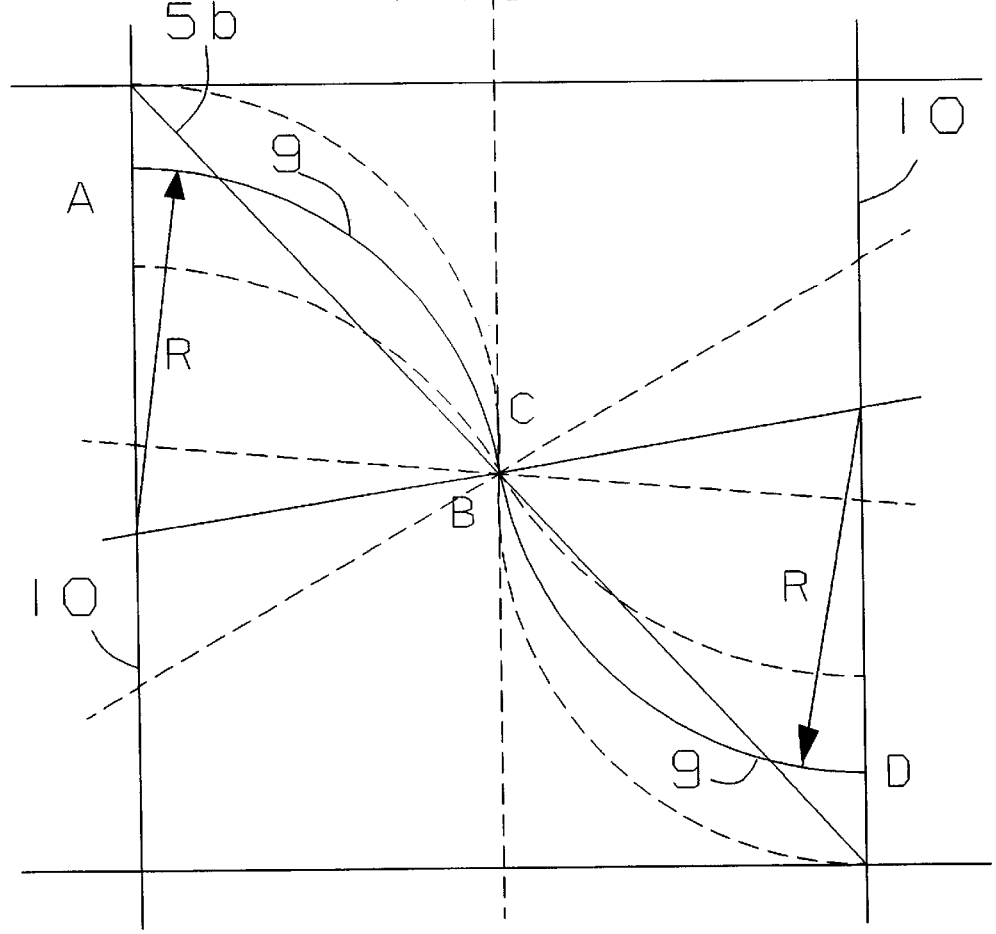
FIG. 5: element of generant with minimal curvature.

One sees, FIG. 5, on a very increased vertical scale, an original element of turned over generant 5*b*, and, in plain strokes, two arcs of circles of the same radius R constituting the optimal generant with minimal curvature from which the length is the same one as that of the turned over generant 5*b*.

The arcs in hidden lines show that there is always at least such an arc of circle, between the smaller arc and the larger arc.

These arcs of circle are centered on lines 10 of translation of the ends of the element of generant 4*b* of the mirror; they can thus be connected to the arcs of the adjacent generants, centered on these same lines of translation, but of different radiuses.

Facility of Manufacture.

For reasons of facility of manufacture of the auxiliary of folding, the elements of generant, direct or turned over, can be replaced, while preserving the same developed length, or a slightly higher length, by a special curve whose maximum curvature curvature does not involve permanent deformation of the mirror.

Orders of Magnitude.

A relative elastic lengthening of $\frac{1}{1000}$ authorizes, for a 10 micron thickness film, a radius of curvature of 5 mm.

The slope of the periphery of a mirror open to F1 is ¼; distant plans of 1 mm cut out with this periphery elements of generant of 4 mm width, whose arcs of circle of minimal curvature have approximately 5 mm of radius.

The auxiliary of folding of 1 mm thickness must have, with this same elastic limit, a minimal radius of rolling up of 500 mm.

Maintenance by Lowering of Pressure.

According to the invention, the air is extracted between the membrane to fold and the auxiliary of folding 3, so as to keep the membrane folded against this auxiliary of folding, and to allow the cylindrical rolling up of the whole without separation of the folded membrane.

Maintenance by Electrostatic Attraction.

In another realization of the invention, the folded membrane is solidarized with the auxiliary of folding by electrostatic attraction.

Separation of the Folded Membrane and the Auxiliary of Folding.

After course of cylindrical rolling up, the auxiliary of folding finds its pseudo flatness.

Electrostatic Separation.

The auxiliary of folding has, according to the invention, of the centered circular drivers which one can individually carry to a potential selected.

By putting the membrane folded at a certain potential, and by putting at the same potential the first peripheral circular driver of the auxiliary of folding, the resulting force will draw aside from the auxiliary of folding the periphery of the folded membrane.

By successively charging the various circular conductors of the auxiliary of folding 8, one will separate the membrane gradually from it.

Under the effect of its electric charges the membrane will regain its paraboloidal shape as it will be released from the auxiliary of folding.

Separation by Gas Blowing.

In a particular realization the auxiliary of folding is porous or micro perforated.

It is doubled on its dorsal surface by a tight film.

If one insert a gas between the film and the auxiliary of folding, one reveals a layer of gas between this auxiliary of folding and the membrane, causing their separation.

Separation by Acceleration.

By accelerating the auxiliary of folding perpendicular to his surface, one helps the membrane to regain his initial shape in the effect of the electric charges.

Rings of Connection. (FIG. 1)

The various membranes of the optical unit, mirror 1, actuating membrane 2 and auxiliary of folding 3, have a central opening, and are provided, on the level of this opening, rigid rings of connection 12, 13, 14 allowing the soildarisation of these membranes the enclosure of the storey mirror of the telescope.

Rigid Elements of Working. (FIGS. 6 and 7)

To allow the work of the auxiliary of folding and of the membranes which are solidarized with it, there exists, according to the invention, a diametrical linear reinforcement 61 of the auxiliary of folding ensuring its rigidity according to the diameter parallel with the axis of cylindrical rolling up and dividing this auxiliary of folding into two half-circles.

In another realization, there exists, according to the invention, a diametrical linear element rigid 16 interdependent in its medium of the central rigid ring of the auxiliary of folding, slightly longer than the diameter of this auxiliary, and around of which this one isrolled up.

In another realization, there is a second rigid linear element which can be laid out cross compared to the first, after unfolding of the auxiliary of folding.

In another realization there exists, to facilitate the rolling up and the unfolding auxiliary of folding, of the multiple linear dorsal reinforcements parallel with the reinforced diameter.

Rigidity and Flatness of the Auxiliary of Folding. (FIG. 1)

To restore the pseudo flatness of the auxiliary of folding 3 and to ensure its rigidity, there exists, according to the invention, at its periphery a circular tube 17 inflatable and rigidiflable, and rigidizing on its dorsal face, radial inflatable and rigidizing tubes located symmetrically.

In another realization, there are inflatable and rigidiflables tubes perpendicular to the diametrical reinforcement, and which make it possible by their swelling to unroll the auxiliary of folding.

Cylindrical Rolling Up. (FIGS. 6 and 7)

In a first realization, the two half-membranes are rolled up separately to give two cylinders 18 and 19 parallel to the linear rigid element.

In a second realization, cylindrical folding is carried out in two times.

Initially, one of the half-membranes is rolled up above the linear rigid element 16 to form a cylindrical rolling up parallel with this rigid element linear and external with him, and in the second time, the other half-membrane is rolled up around the first cylindrical rolling up and the linear rigid element.

Anisotropy of the Auxiliary of Folding.

With the object of giving a maximum solidity to the auxiliary of folding in the direction of the constraints of orbiting, and optimal flexibility in the direction of cylindrical rolling up, there exists, according to the invention, an anisotropic ordering of fibers of composite constituting material.

Square Auxiliary of Folding.

With the object of facilitating the maintenance of the auxiliary of folding during its orbiting, it has the form of a square.

In this manner the auxiliary of folding can be simply suspended, which eliminates possible problems of buckling.

Circular perforations facilitate the of the circular central part division when the auxiliary of folding is unrolled; this cutting is obtained using a tool fixed on the linear rigid element interdependent of the rings of connection, and in front of which the auxiliary of folding turns.

Reversal of the Membrane Mirror.

With the object of having the best surface like surfaces reflective, the membrane mirror is returned, convex surface becoming concave surface.

Second Actuating Membrane.

If the mirror has a surface mass much lower than that of the membrane, it is not possible to damp out the vibrations or parasitic movements of the membrane by a reciprocal action.

There exists, according to the invention, a second actuating membrane, surface mass close to that of the first, <and whose mechanical properties are first with those of this first membrane>.

What is claimed is:

1. Telescope including at least:
   a) a circular membranous concave mirror,
   b) a device to fold the said mirror, characterized in that the device to fold the said mirror consists of a thin flat disc called auxiliary of folding, comprising centered circular undulations, on which is applied concentrically the membranous mirror, allowing folding and displacement of the said membranous mirror.

2. Device according to claim 1, characterized in that one or several membranes are associated with the membranous mirror and are also applied on the auxiliary of folding and folded at the same time as the said membranous mirror.

3. Device according to claim 2, characterized in that the auxiliary of folding is fitted with electric circuits operating on the one or the several membranes associated with the membranous mirror.

4. Device according to claim 1, characterized:
   in that an auxiliary generant is constituted by sequences of pairs of arcs of curve connected tangentially with preceding and following pairs to form higher parts and lower parts of the undulations, the arcs of each pair being connected tangentially, at the median level of these undulations;
   and in that the developed lengths of the arcs are substantially equal or slightly higher than the developed lengths of the generating lines of the parts of the membranous mirror applied onto them.

5. Device according to claim 4, characterized in that the arcs of curve (AB) and (CD) are arcs of circle.

6. Device according to claim 1, characterized in that a diametrical linear reinforcement divides the auxiliary of folding into two half-circles.

7. Device according to claim 6, characterized in that there are multiple linear reinforcements parallel with the diametrical linear reinforcement.

8. Device according to claim 7, characterized in that the multiple linear reinforcements result from the anisotropic distribution of fibers of composite material constituting whole or part of the auxiliary of folding.

9. Device according to claim 1, characterized in that the auxiliary of folding, with a view to its displacement, is rolled up parallel to its diametrical linear reinforcement, each half-circle determined by the said diametrical linear reinforcement being rolled up independently, to shape two contiguous cylindrical rollings up.

10. Device according to claim 1, characterized in that the auxiliary of folding, with a view to its displacement, is rolled up parallel to its diametrical linear reinforcement, one half-circle being initially rolled up in an interior rolling up, and the second half-circle being then rolled up in an exterior rolling up incorporating the first rolling up.

11. Device according to claim 1, characterized in that the auxiliary of folding is fitted with inflatable and rigidizing tubes whose inflating ensures the unfolding of the said auxiliary of folding.

12. Device according to claim 4, characterized in that the mirror is turned over before its fixing on the auxiliary of folding, its concave surface becoming its convex surface.

13. Device according to claim 1, characterized in that the natural shape of the auxiliary of folding is that of two parallel cylindrical rolling up.

14. Device according to claim 1, characterized in that the concave membranous mirror, with a view to its application on the auxiliary of folding, is fitted with a closing lid and a rigid ring which can move parallel to the optical axis of the said membranous mirror, and in that the pressure inside a cavity thus obtained between the closing lid and concave membranous mirror is higher than the pressure outside.

15. Device according to claim 14, characterized in that there is a liquid inside a hollow of the concave membranous mirror, ensuring that the pressure on the concave side of the mirror is higher than on the convex side.

16. Device according to claim 14, characterized in that the concave membranous mirror, with higher pressure in the cavity than outside, is moved parallel to the optical axis of the membranous mirror so that the membranous mirror is applied on the auxiliary of folding.

17. Device according to claim 1, characterized in that the auxiliary of folding is not circular.

18. Device according to claim 1 characterized in that a developed length of a generating line of the auxiliary of folding, called auxiliary generant, is substantially equal or slightly higher than a developed length of a generating line of the said mirror, called mirror generant, a generating line being the line whose revolution around an axis generates the membranous mirror or the auxiliary of folding.

\* \* \* \* \*